United States Patent
Kim et al.

(10) Patent No.: US 7,288,715 B2
(45) Date of Patent: Oct. 30, 2007

(54) HIGH-VACUUM-MAINTAINING STRUCTURE OF SUPERCONDUCTING CABLE

(75) Inventors: Do-woon Kim, Anyang-si (KR); Soo-yeon Kim, Anyang-si (KR)

(73) Assignee: LG Cable Ltd., Seoul (KR)

( * ) Notice: Subject to any disclaimer, the term of this patent is extended or adjusted under 35 U.S.C. 154(b) by 422 days.

(21) Appl. No.: 11/003,655

(22) Filed: Dec. 3, 2004

(65) Prior Publication Data
US 2005/0126805 A1    Jun. 16, 2005

(30) Foreign Application Priority Data
Dec. 10, 2003 (KR) .................. 10-2003-0089857

(51) Int. Cl.
*H01B 12/00* (2006.01)
(52) U.S. Cl. ....................... 174/15.5; 29/599
(58) Field of Classification Search ............ 174/125.1, 174/15.4, 15.5; 29/599
See application file for complete search history.

(56) References Cited

U.S. PATENT DOCUMENTS

| | | | |
|---|---|---|---|
| 3,947,622 A | 3/1976 | Graneau | |
| 4,845,308 A * | 7/1989 | Womack et al. | 174/15.4 |
| 6,576,843 B1 | 6/2003 | Ashworth | |
| 6,759,593 B2 * | 7/2004 | Spreafico | 174/125.1 |
| 2002/0170733 A1 * | 11/2002 | Rasmussen | 174/68.1 |
| 2005/0056456 A1 * | 3/2005 | Ladie' et al. | 174/125.1 |

* cited by examiner

*Primary Examiner*—Ishwar (I. B.) Patel
(74) *Attorney, Agent, or Firm*—John P. White; Cooper & Dunham LLP

(57) ABSTRACT

Disclosed herein is a high-vacuum-maintaining structure of a superconducting cable. The superconducting cable includes inner and outer metal tubes, and spacers disposed between the inner and outer metal tubes for spacing them by a prescribed distance. To the spacers is attached a gathering material, which serves to adsorb residual gas between the inner and outer metal tubes, thereby maintaining the superconducting cable in a high-vacuum state for a long time, improving thermal insulation performance of the superconducting cable, and reducing cooling costs and maintenance costs required for vacuum pumping thereof.

8 Claims, 2 Drawing Sheets

HIGH-VACUUM-MAINTAINING STRUCTURE OF SUPERCONDUCTING CABLE

BACKGROUND OF THE INVENTION

1. Field of the Invention

The present invention relates to a high-vacuum-maintaining structure of a superconducting cable, and more particularly to a high-vacuum-maintaining structure of a superconducting cable which enables simple and uniform removal of residual gas inside a superconducting electric power transmission cable having a considerably long length, thereby maintaining the interior of the superconducting cable in a high-vacuum state for a long time, as well as improving thermal insulation performance of the superconducting cable, and achieving reductions in cooling costs and maintenance costs required for vacuum pumping.

2. Description of the Related Art

In general, the term "superconductivity" indicates a phase having a substantially null resistivity in a cryogenic state, such as, for example, below a given temperature of −196 degrees centigrade, and the term "superconducting cable" indicates an electric power transmission cable made of certain conductors exhibiting superconductivity.

The superconducting cable comprises a cable core having one or more tapes of superconductors and insulators wound on a former, defining a liquid nitrogen flow channel and a cryostat surrounding the cable core to define the liquid nitrogen flow channel and serving as a vacuum thermal insulation layer.

Referring to FIG. 1, illustrating a conventional cryostat designated as reference numeral 1, it is thermally insulated by maintaining a high-vacuum level between an inner metal tube 10 and an outer metal tube 15 thereof, taking the form of corrugated tubes. Between the inner and outer metal tubes 10 and 15 there are taped multi-layered insulators (not shown) in order to obstruct heat from being exchanged between a normal ambient temperature and a cryogenic temperature of liquid nitrogen.

Furthermore, in order to prevent heat-contact between the inner and outer metal tubes 10 and 15 and the multi-layered insulators interposed therebetween, and to concentrically maintain the inner and outer metal tubes 10 and 15, the cryostat 1 comprises spacers 20 taped between the inner and outer metal tubes 10 and 15. Conventionally, the spacers 20 are in the form of spirally-wound Teflon™ or polyester wires placed between the inner and outer metal tubes 10 and 15.

One of the problems of the conventional cryostat 1 is that it is difficult to maintain a high vacuum level between the inner and outer metal tubes, 10 and 15 due to residual gas (G) generated from the inner and outer metal tubes 10 and 15 as well as the insulators.

Since general low-temperature containers for use in other technical fields have a relatively short length, the residual gas (G) generated therein can be easily removed, as the low-temperature containers are washed by an ultrasonic washing technique or are heated in a furnace when being manufactured. However, in case of the cryostat 1, constituting the superconducting electric power transmission cable, due to a considerably long length thereof equal to hundreds of meters, there is difficulty in removing the residual gas (G) therefrom using the ultrasonic washing technique or heating in a furnace.

If the residual gas (G) generated in the cryostat 1 is not removed, the cryostat 1 suffers from deterioration in vacuum level and thermal insulation performance thereof, resulting in a problematic increase in cooling costs and maintenance costs required for periodic vacuum pumping operations.

Additionally, there is a concern that the residual gas (G) may affect the critical temperature of the superconductors, thereby deteriorating electrical signal transmission properties of a system.

SUMMARY OF THE INVENTION

Therefore, the present invention has been made in view of the above problems, and it is an object of the present invention to provide a high-vacuum-maintaining structure of a superconducting cable, which enables simple and uniform removal of residual gas inside the superconducting electric power transmission cable having a considerably long length, thereby maintaining the interior of the superconducting cable in a high-vacuum state for a long time as well as improving thermal insulation performance of the superconducting cable, and achieving reduction in cooling costs and maintenance costs required for vacuum pumping.

In accordance with the present invention, the above and other objects can be accomplished by the provision of a high-vacuum-maintaining structure of a superconducting cable, the superconducting cable comprising spacers disposed between inner and outer metal tubes for spacing them by a prescribed distance, the high-vacuum-maintaining structure comprising: a gathering material attached to the spacers for adsorbing residual gas between the inner and outer metal tubes.

Preferably, the gathering material may be attached to one or more layers of meshed nets made of a synthetic resin material.

Preferably, the gathering material may be received in a plurality of circular or polygonal cross-sectional recipients, which are spaced apart from one another by a prescribed distance, so as to be attached to the meshed nets by the prescribed distance.

Preferably, the inner and outer metal tubes may be in the form of corrugated tubes, and recipients used to receive the gathering material may be sized so that the respective recipients are larger than a corrugation pitch of the corrugated inner and outer metal tubes so as not to be buried in a groove on the corrugated inner and outer metal tubes, and may be arranged so that they are spaced apart from one another by a distance equal to two to twenty times the corrugation pitch.

Preferably, the gathering material may be charcoal, zeolite, or graphite.

Preferably, at least four of the meshed nets, to which the gathering material is attached, may be positioned equidistantly on the circumference between the inner and outer metal tubes.

Preferably, the gathering material may be attached to both front and rear surfaces of one layer of the meshed net, or between two layers of the meshed nets.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
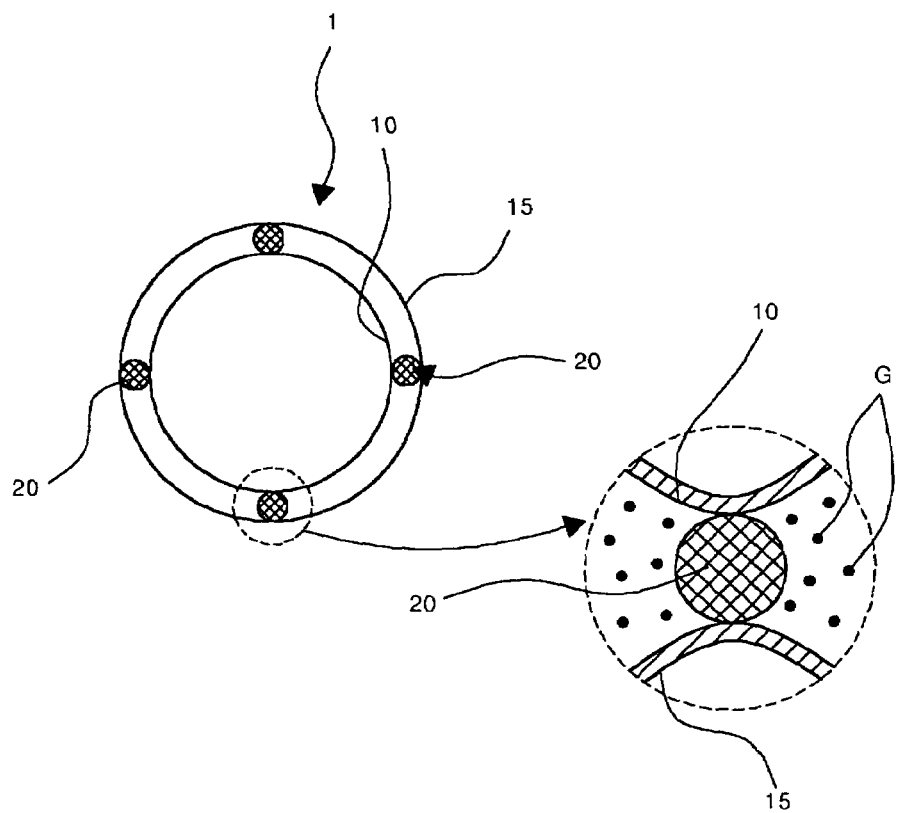
FIG. 1 is a cross-sectional view illustrating a conventional cryostat.

A preferred embodiment of the present invention will now be described in detail with reference to the accompanying drawings in which the same components as that of the conventional apparatus are denoted by the same reference numerals.

Figure 2:
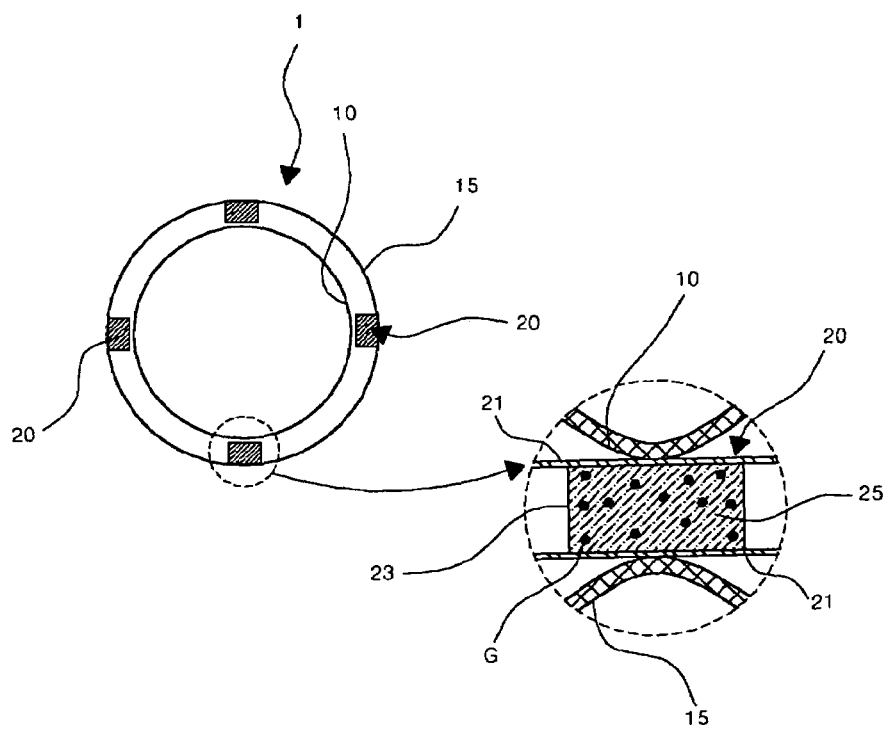
FIG. 2 is a cross-sectional view illustrating a cryostat according to the present invention.
Figure 3:
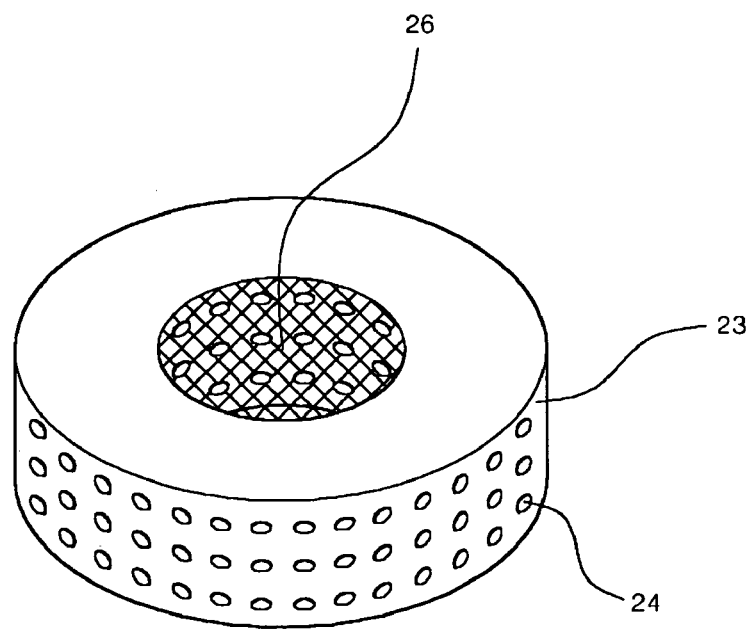
FIG. 3 is a perspective view illustrating a recipient used to receive a gathering material of the present invention.

FIG. 2 is a cross-sectional view illustrating a cryostat according to the present invention. FIG. 3 is a perspective view illustrating a recipient used to receive a gathering material of the present invention.

As shown in FIGS. 2 and 3, the cryostat 1, constituting a superconducting cable, comprises the inner and outer metal tubes 10 and 15, which are concentrically arranged so that they are spaced apart from each other by means of the spacers 20. In the present invention, each of the spacers 20 is configured in such a fashion that a gathering material 25 is uniformly distributed and attached to one or more layers of meshed nets 21. The gathering material 25 serves to adsorb the residual gas (G) to maintain the interior of the cryostat 1 in a high-vacuum state for a long time, thereby improving thermal insulation performance and reducing maintenance costs of the cryostat 1.

In the same manner as the prior art, the inner and outer metal tubes 10 and 15 are in the form of corrugated tubes, and multi-layered insulators (not shown) are taped between the corrugated inner and outer metal tubes 10 and 15.

In a state wherein the gathering material 25 according to the present invention is attached thereto, the spacers 20 are taped onto internal or external portions of the multi-layered insulators without limitation, so long as they can space the inner and outer metal tubes 10 and 15 sufficient to secure good thermal insulation performance therebetween.

Preferably, the gathering material 25 used to adsorb the residual gas (G) inside the cryostat 1 is selected from among charcoal, zeolite, graphite, etc., but is not limited thereto, and other known adsorbents capable of adsorbing the residual gas (G) are usable.

The gathering material 25 is in the form of powder received in a plurality of circular or polygonal cross-sectional recipients 23, and attached to the meshed nets 21 by means of an adhesive. In the present embodiment, as shown in FIG. 3, each of the recipients 23 has a plurality of through-holes 24 formed along the periphery thereof, and an entrance of the recipient 23 is covered with a meshed net for recipient 26 having a mesh smaller than a particle size of the gathering material 25.

Considering the recipient 23 in more detail, with reference to FIG. 2, the recipient 23 is larger than a corrugation pitch of the inner and outer metal tubes 10 and 15 so as not to be buried in a groove on corrugated surfaces of the inner and outer metal tubes 10 and 15, and all of the recipients 23 are uniformly attached to the meshed nets 21 so that they are spaced apart from one another by an appropriate distance equal to two to twenty times the corrugation pitch.

If one layer of the meshed net 21 is taped between the inner and outer metal tubes 10 and 15, the gathering material 25 is attached to both front and rear surfaces of the meshed net 21. Alternatively, if two layers of the meshed nets 21 are taped, the gathering material 25 is attached in a row between the meshed nets 21.

Such one or more layers of the meshed nets 21 are made of a synthetic resin material, having good thermal insulation performance such as Teflon™ or polyester, etc. and are equally spaced by a distance of 90 degrees in a circumferential direction between the corrugated inner and outer metal tubes 10 and 15. Thereby, the inner and outer metal tubes 10 and 15 are spaced apart from each other by a certain distance and are concentrically arranged.

One or more layers of the meshed nets 21 may be taped between the inner and outer metal tubes 10 and 15, before or after taping the multi-layered insulators onto the inner metal tube 10, at portions between or on the multi-layered insulators.

Figure 4:
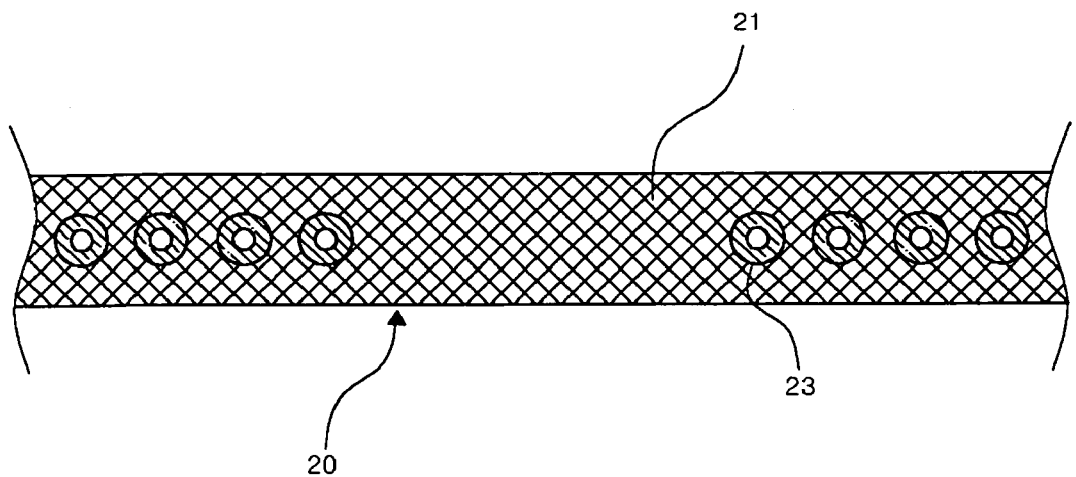
FIG. 4 is a plan view of a spacer, illustrating the recipient attached to a meshed net.

FIG. 4 is a plan view of the spacer 20 illustrating an attached state of the recipients 23 to the meshed net 21, the recipients 23 receiving the gathering material 25.

Now, an operation of the present invention will be explained.

Between the inner and outer metal tubes 10 and 15, as shown in FIG. 2, there are taped spacers 20, provided with the gathering material 25, so that the residual gas (G), which is generated from the inner and outer metal tubes 10 and 15 as well as the multi-layered insulators, and is not vacuum-pumped, is adsorbed by the gathering material 25, thereby enabling the interior of the cryostat 1 to be maintained in a high-vacuum state for a long time.

By virtue of the fact that the cryostat 1 utilizes the meshed nets 21 with the attached gathering material 25 as a constituent of the spacers 20, the taping of the spacers 20 can be simply performed by means of a general taping apparatus used to tape the multi-layered insulators. This has an effect of eliminating the necessity of separate taping equipment and enabling the gathering material 25 to be uniformly distributed even on the cryostat 1 of a considerably long cable, equal to hundreds of meters, resulting in uniform adsorption of the residual gas (G).

As apparent from the above description, according to the present invention, since a gathering material is attached to spacers provided in a cryostat to adsorb and remove residual gas inside the cryostat, the cryostat can be maintained in a high-vacuum state for a long time, resulting in improved thermal insulation performance thereof. This has an effect of reducing the load of cooling the cryostat, and reducing maintenance costs required for vacuum pumping.

Further, according to the present invention, since the spacers include meshed nets in the form of sheets, to which the gathering material is attached, the taping of the spacers can be simply and easily performed using a general taping apparatus without requiring separate equipment.

Although the preferred embodiment of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A high-vacuum-maintaining structure of a superconducting cable, including spacers disposed between inner and outer metal tubes of the superconducting cable for spacing them by a prescribed gap, wherein each spacer includes one or more layers of meshed nets, a plurality of recipients attached to said one or more layers of meshed nets and spaced apart from one another by a prescribed distance, and a gathering material which is received in said recipients to attach to said meshed nets and is used for adsorbing residual gas between the inner and outer metal tubes; and the inner and outer metal tubes are in the form of corrugated tubes, and recipients used to receive the gathering material are sized so that the respective recipients are larger than a corrugation pitch of the corrugated inner and outer metal tubes so as not to be buried in a groove on the corrugated inner and outer metal tubes, and are arranged so that said prescribed distance is equal to two to twenty times the corrugation pitch.

2. The structure as set forth in claim 1, wherein the meshed nets are made of a synthetic resin material.

3. The structure as set forth in claim 2, wherein at least four of the meshed nets, to which the gathering material is attached, are positioned equidistantly on the circumference between the inner and outer metal tubes.

4. The structure as set forth in claim 2, wherein the gathering material is attached to both front and rear surfaces of one layer of the meshed net, or between two layers of the meshed nets.

5. The structure as set forth in claim 1, wherein the recipient has a circular or polygonal cross-section.

6. The structure as set forth in claim 5, wherein at least four of the meshed nets, to which the gathering material is attached, are positioned equidistantly on the circumference between the inner and outer metal tubes.

7. The structure as set forth in claim 5, wherein the gathering material is attached to both front and rear surfaces of one layer of the meshed net, or between two layers of the meshed nets.

8. The structure as set forth in claim 1, wherein the gathering material is charcoal, zeolite, or graphite.

* * * * *